US012725990B2

(12) United States Patent
Peng et al.

(10) Patent No.: US 12,725,990 B2
(45) Date of Patent: Sep. 1, 2026

(54) COAXIAL CONNECTOR

(71) Applicant: F TIME TECHNOLOGY INDUSTRIAL CO., LTD., New Taipei City (TW)

(72) Inventors: Chang-Lin Peng, New Taipei City (TW); Chih-Min Peng, New Taipei City (TW); Yu-Han Huang, New Taipei City (TW)

(73) Assignee: F TIME TECHNOLOGY INDUSTRIAL CO., LTD., New Taipei City (TW)

( * ) Notice: Subject to any disclaimer, the term of this patent is extended or adjusted under 35 U.S.C. 154(b) by 370 days.

(21) Appl. No.: 18/634,582

(22) Filed: Apr. 12, 2024

(65) Prior Publication Data

US 2025/0323461 A1 Oct. 16, 2025

(51) Int. Cl.

*H01R 24/50* (2011.01)
*H01R 13/436* (2006.01)
*H01R 13/622* (2006.01)

(52) U.S. Cl.

CPC ........... *H01R 24/50* (2013.01); *H01R 13/436* (2013.01); *H01R 13/622* (2013.01)

(58) Field of Classification Search

CPC .... H01R 24/50; H01R 13/436; H01R 13/622; H01R 2103/00; H01R 2201/20; H01R 24/46; G01R 1/0416

See application file for complete search history.

(56) References Cited

U.S. PATENT DOCUMENTS

| | | | | | |
|---|---|---|---|---|---|
| 4,797,121 | A * | 1/1989 | Hayward | H01R 24/547 | 439/579 |
| 5,769,652 | A * | 6/1998 | Wider | H01R 24/50 | 439/63 |
| 5,775,927 | A * | 7/1998 | Wider | H01R 24/542 | 439/944 |
| 5,909,063 | A * | 6/1999 | Silliman | H01R 24/46 | 200/51.07 |
| 7,168,980 | B2 * | 1/2007 | Peng | H01R 24/40 | 439/580 |
| 7,416,444 | B1 * | 8/2008 | Lin | H01R 24/40 | 439/578 |
| 7,544,086 | B1 * | 6/2009 | Wells | H01R 43/26 | 439/489 |
| 7,714,225 | B2 * | 5/2010 | Sloan | H02G 3/20 | 174/64 |

(Continued)

FOREIGN PATENT DOCUMENTS

| | | | |
|---|---|---|---|
| CN | 201160179 | Y | 12/2008 |
| EP | 1146606 | B1 | 10/2001 |
| TW | M307909 | U | 3/2007 |

*Primary Examiner* — Truc T Nguyen

(74) *Attorney, Agent, or Firm* — RABIN & BERDO, P.C.

(57) ABSTRACT

A coaxial connector has a shell, a first signal junction, a second signal junction, a third signal junction, and a moving component. The first signal junction and the second signal junction are mounted on the side surface of the shell, and the third signal junction is mounted on the shell. When the moving component moves to the first position, the moving component is electrically connected to the first signal junction and the third signal junction. When the moving component moves to the second position, the moving component is electrically connected to the second signal junction and the third signal junction.

12 Claims, 10 Drawing Sheets

(56) References Cited

U.S. PATENT DOCUMENTS

| | | | | |
|---|---|---|---|---|
| 7,819,680 | B2 * | 10/2010 | Hoyack | H01R 24/46 439/188 |
| 10,498,061 | B1 * | 12/2019 | Blasick | H05K 7/1454 |
| 10,958,013 | B1 * | 3/2021 | Peng | H01R 24/28 |
| 11,677,195 | B2 * | 6/2023 | Park | H01R 12/714 439/63 |
| 2006/0172561 | A1 * | 8/2006 | Clark | H01R 24/50 439/63 |
| 2006/0264100 | A1 * | 11/2006 | Peng | H01R 24/40 439/580 |
| 2011/0076885 | A1 * | 3/2011 | Shaw | H01R 13/111 439/582 |
| 2011/0237123 | A1 * | 9/2011 | Burris | H01R 13/6456 439/578 |
| 2013/0012062 | A1 * | 1/2013 | Nugent | H01R 43/20 439/578 |
| 2013/0115809 | A1 * | 5/2013 | Hanson | H01R 13/6591 439/578 |
| 2013/0157507 | A1 * | 6/2013 | Riggsby | H01R 13/502 439/583 |
| 2015/0011120 | A1 * | 1/2015 | Goebel | H01R 24/46 439/578 |
| 2015/0118897 | A1 * | 4/2015 | Paynter | H01R 24/54 333/24 C |
| 2015/0263448 | A1 * | 9/2015 | Wu | H01R 24/38 361/728 |
| 2022/0131301 | A1 * | 4/2022 | Volkov | H01R 12/712 |
| 2023/0216255 | A1 * | 7/2023 | Blasick | H01R 12/91 439/752 |

* cited by examiner

COAXIAL CONNECTOR

BACKGROUND OF THE INVENTION

1. Field of the Invention

The present invention relates to a connector, especially to a coaxial connector.

2. Description of the Prior Arts

Having a fastening structure, the coaxial connector as a connector can provide excellent quality of signal transmission. As shown in FIG. 14, a first connector 90 of the coaxial connector has a moving pin 91. A second connector 95 has a plug 96. When the second connector 95 and the first connector 90 are connected, the plug 96 pushes the moving pin 91, thereby changing the electrical connection relationship in the first connector 90.

In addition to being provided with signal junctions at the connection point with the second connector 95, the first connector 90 of the coaxial connector also has a first signal junction 92, a second signal junction 93, and a moving component 94 that is moveable inside the first connector 90 to selectively contact the moving component 94 of the first signal junction 92. Thus, the moving component 94 can keep contacting and being electrically connected with the second signal junction 93 before or after being moved.

Before the first connector 90 and the second connector 95 are connected, the moving component 94 is located at a first position. When the moving component 94 is located at the first position, the moving component 94 contacts and is electrically connected with the first signal junction 92, but the moving component 94 does not contact the moving pin 91 and forms a broken circuit. After the first connector 90 and the second connector 95 are connected, because the plug 96 pushes the moving pin 91, the moving pin 91 pushes the moving component 94. At this moment, the moving component 94 is located at a second position. When the moving component 94 is located at the second position, the moving component 94 is separated from the first signal junction 92, and thus the moving component 94 and the first signal junction 92 are a broken circuit. At this moment, the plug 96 of the second connector 95, the moving component 94 of the first connector 90, the moving pin 91, and the second signal junction 93 are a closed circuit.

Although the prior art provides two conduction modes of the coaxial connector, these two conduction modes are one-to-one conduction. As the signal transmission volume increases, the existing coaxial connectors are gradually insufficient.

To overcome the shortcomings, the present invention provides a coaxial connector to mitigate or obviate the aforementioned problems.

SUMMARY OF THE INVENTION

The main objective of the present invention is to provide a coaxial connector.

The coaxial connector has a shell, at least one first signal junction, at least one second signal junction, a third signal junction, a moving pin, a moving component. The at least one first signal junction is mounted at a side surface of the shell. The at least one second signal junction is mounted at the side surface of the shell. The third signal junction is mounted on the shell. The moving pin is movably mounted in the shell. The moving component is movably mounted in the shell and selectively moved between a first position and a second position.

wherein the at least one second signal junction is located between the at least one first signal junction and the third signal junction. when the moving component is moved to the first position, the moving component and the at least one first signal junction are electrically connected, and the moving component and the third signal junction are electrically connected. When the moving component is moved to the second position, the moving component and the at least one second signal junction are electrically connected, and the moving component and the third signal junction are electrically connected.

In conclusion, the coaxial connector enhances diversity and throughput of signal transmission by mounting two signal junctions (the first signal junction and the second signal junction) on the side surface of the coaxial connector. Moreover, there are multiple first signal junctions and multiple second signal junctions, so the coaxial connector can be connected to several devices simultaneously. The first signal junction and the second signal junction have the elastic conductive component, thereby the moving component can firmly abut on the elastic conductive component when the moving component is at different positions. This not only ensures the signal transmission quality, but also lowers the requirement of the manufacturing accuracy. After all, the third signal junction can be a radio frequency connector, there is no need to manually strip and solder wires, so the signal status is the same for different operators when making connections, thereby avoiding different results in different tests with the same product.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
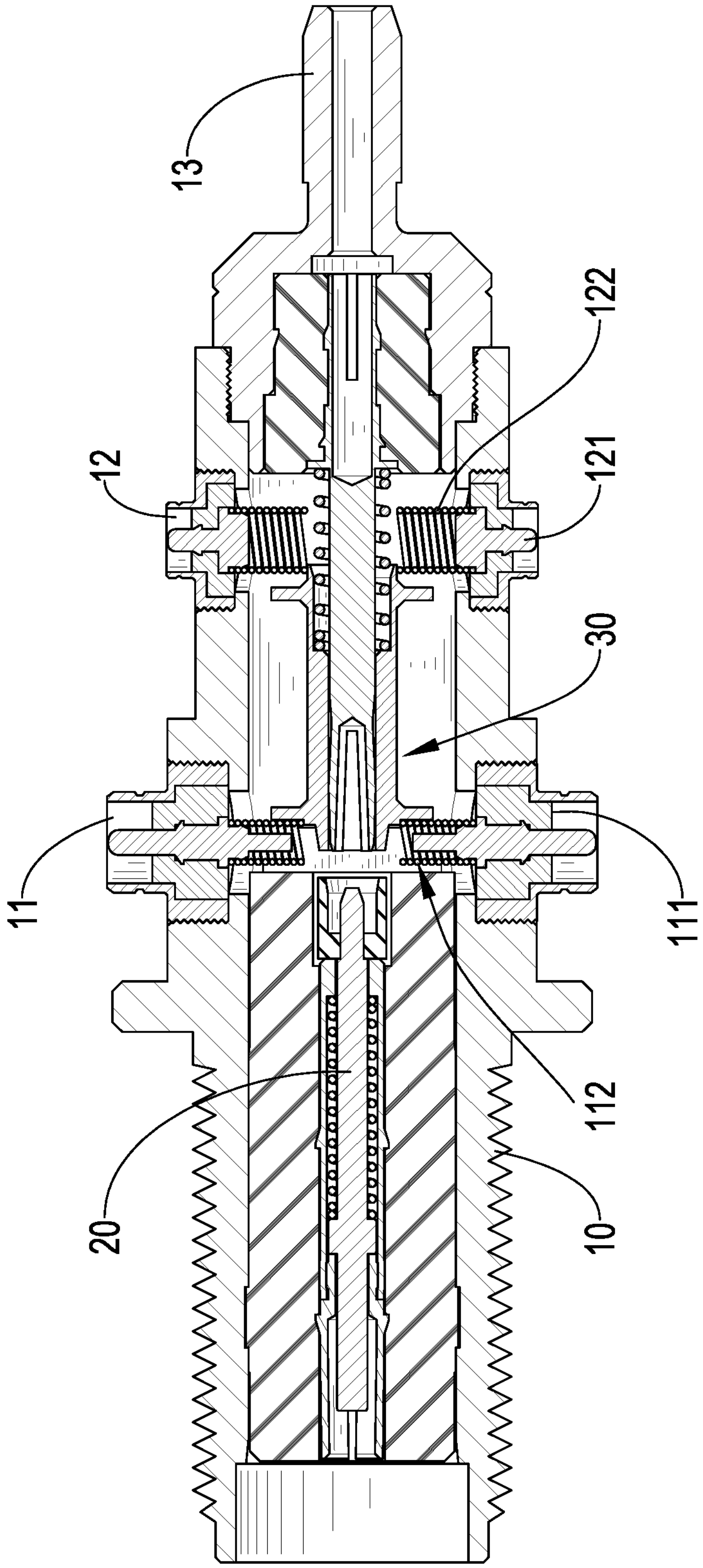
FIG. 1 is a cross sectional view of a first preferred embodiment in accordance with the present invention, wherein the moving component is located at the first position.
Figure 2:
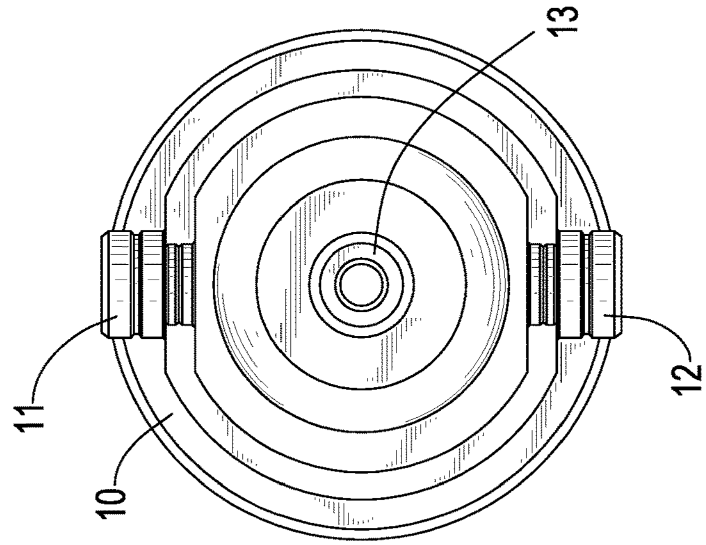
FIG. 2 is an end view of the first preferred embodiment in accordance with the present invention.

With reference to FIG. 1 and FIG. 2, a coaxial connector in a first preferred embodiment in accordance with the present invention comprises a shell 10, at least one first signal junction 11, at least one second signal junction 12, a third signal junction 13, a moving pin 20, and a moving component 30.

The at least one first signal junction 11 and the at least one second signal junction 12 are mounted at a side surface of the shell 10. The third signal junction 13 is mounted on the shell 10. The at least one second signal junction 12 is located between the at least one first signal junction 11 and the third signal junction 13. The at least one first signal junction 11 and the at least one second signal junction 12 can each be a radio frequency connector. Specifically, the at least one first signal junction 11 is similar with the at least one second signal junction 12 in structure. The at least one first signal junction 11 and the at least one second signal junction 12 each respectively have a ring electrode and a column electrode. The ring electrode is located at a center of the column electrode.

In this embodiment, each of the at least one first signal junction 11 has a first external connecting part 111 and a first internal connecting part 112. The first external connecting part 111 is exposed on the shell 10. The first internal connecting part 112 is located in the shell 10, and is electrically connected to the first external connecting part 111. The first internal connecting part 112 is an elastic conductive component. Specifically, the first internal connecting part 112 can be a spring or a shrapnel. Similarly, each of the at least one second signal junction 1 has a second external connecting part 121 and a second internal connecting part 122. The second external connecting part 121 is exposed on the shell 10. The second internal connecting part 122 is located in the shell 10, and is electrically connected to the second external connecting part 121. The second internal connecting part 122 is an elastic conductive component. Specifically, the second internal connecting part 122 can be a spring or a shrapnel.

Figure 4:
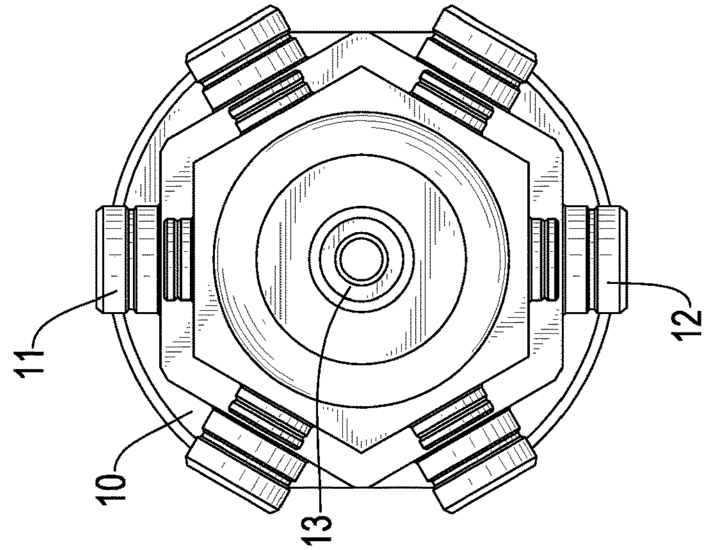
FIG. 4 is an end view of another configuration of the first preferred embodiment in accordance with the present invention.
Figure 3:
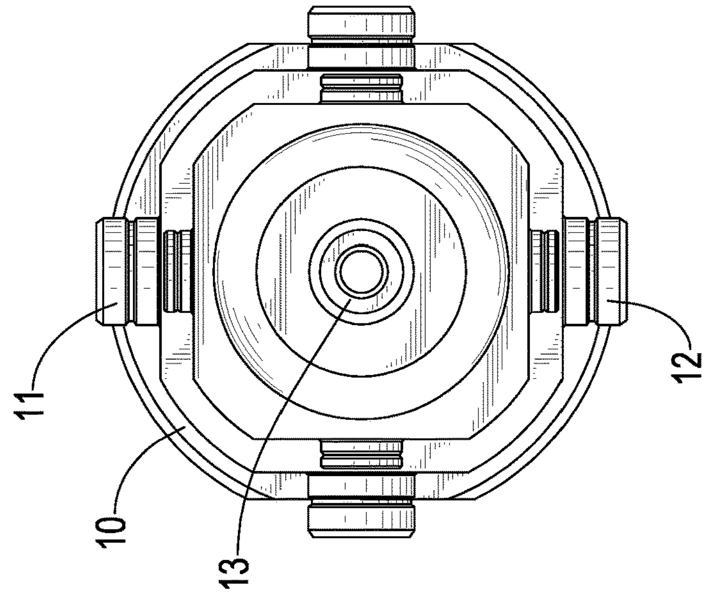
FIG. 3 is an end view of another configuration of the first preferred embodiment in accordance with the present invention.

With reference to FIG. 2, in this embodiment, an amount of the at least one first signal junction 11 is two. An amount of the at least one second signal junction 12 is two. In other embodiments, the amount of the at least one first signal junction 11 can be four (shown as FIG. 3), six (shown as FIG. 4), or more. The amount of the at least one second signal junction 12 can be four (shown as FIG. 3), six (shown as FIG. 4), or more. The amount of the at least one first signal junction 11 may not be the same as the amount of the at least one second signal junction 12. In addition, multiple said first signal junctions 11 are located at a first imaginary plane. The first imaginary plane is perpendicular to an axial direction of the shell 10. In this embodiment, multiple said first signal junctions 11 are distributed point-symmetrically on the first imaginary plane with an axis of the shell 10 as a symmetry axis. Similarly, multiple second signal junctions 12 are located at a second imaginary plane. The second imaginary plane is perpendicular to the axial direction of the shell 10. In this embodiment, the multiple second signal junctions 12 are distributed point-symmetrically on the second imaginary plane with an axis of the shell 10 as a symmetry axis.

The third signal junction 13 can be mounted on an end or the side surface of the shell 10. In this embodiment, the third signal junction 13 is mounted on the end of the shell 10, and located along an axis of the shell 10. The third signal junction 13 can be a metal protrusion for connecting wires by stripping and welding, but not limited to this.

Figure 5:
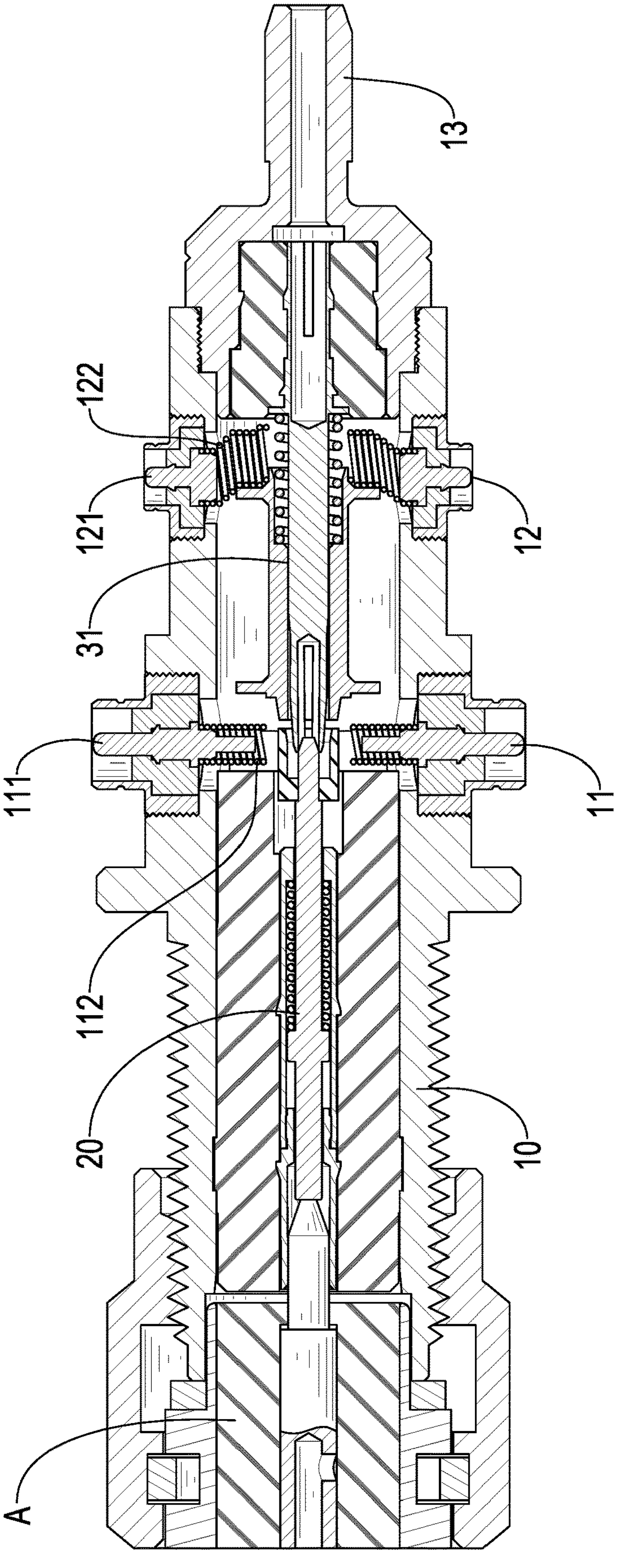
FIG. 5 is a cross sectional view of the first preferred embodiment connected to the external connector in accordance with the present invention, wherein the moving component is located at the second position.

With reference to FIG. 1 and FIG. 5, the moving pin 20 and the moving component 30 are movably mounted in the shell 10. The moving direction of the moving pin 20 and the moving direction of the moving component 30 are both parallel to the axis of the shell 10. Specifically, the moving component 30 is capable of being selectively moved to a first position and a second position. When the coaxial connector is connected to an external connector A, the external connector A will push the moving pin 20, and then the moving pin 20 will push the moving component 30. Thereby the moving component 30 moves from the first position to the second position.

According to the abovementioned structure, when the moving component 30 moves to the first position (as shown in FIG. 1), the moving component 30 contacts the first internal connecting part 112 of the first signal junction 11, thereby the moving component 30 is electrically connected to the at least one first signal junction 11. At the same time, the moving component 30 is electrically connected to the third signal junction 13. Therefore, the at least one first signal junction 11 and the third signal junction 13 are a closed circuit, but the at least one first signal junction 11 and the at least one second signal junction 12 are a broken circuit, and the third signal junction 13 and the at least one second signal junction 12 are a broken circuit.

When the moving component 30 moves to the second position (as shown in FIG. 5), the moving component 30 is separated from the at least one first signal junction 11, and moves to contact the second internal connecting part 122 of the second signal junction 12. Thereby the moving component 30 is electrically connected to the second signal junction 12. At the same time, the moving component 30 is electrically connected to the third signal junction 13. In other words, no matter what position the moving component 30 moves to, the moving component 30 is always electrically connected to the third signal junction 13. When the moving component 30 moves to the second position, the at least one second signal junction 12 and the third signal junction 13 are a closed circuit. But the at least one second signal junction 12 and the at least one first signal junction 11 are a broken circuit, and the third signal junction 13 and the at least one first signal junction 11 are a broken circuit. At this moment, the external connector A, the at least one second signal junction 12, and the third signal junction 13 can be a closed circuit via the moving pin 20 and the moving component 30.

Figure 6:
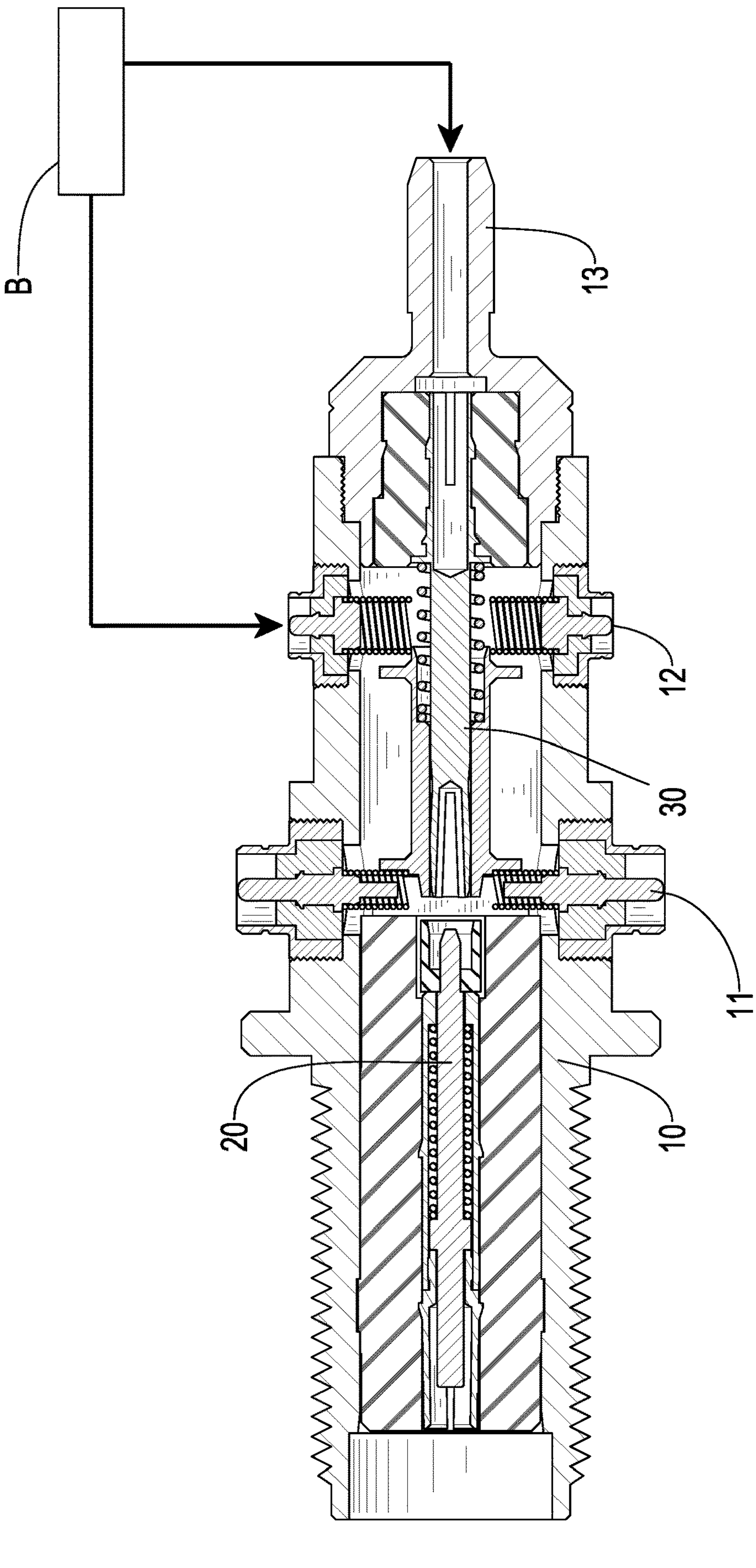
FIG. 6 is a cross sectional view of the first preferred embodiment in accordance with the present invention, wherein the moving component is located at the first position.
Figure 7:
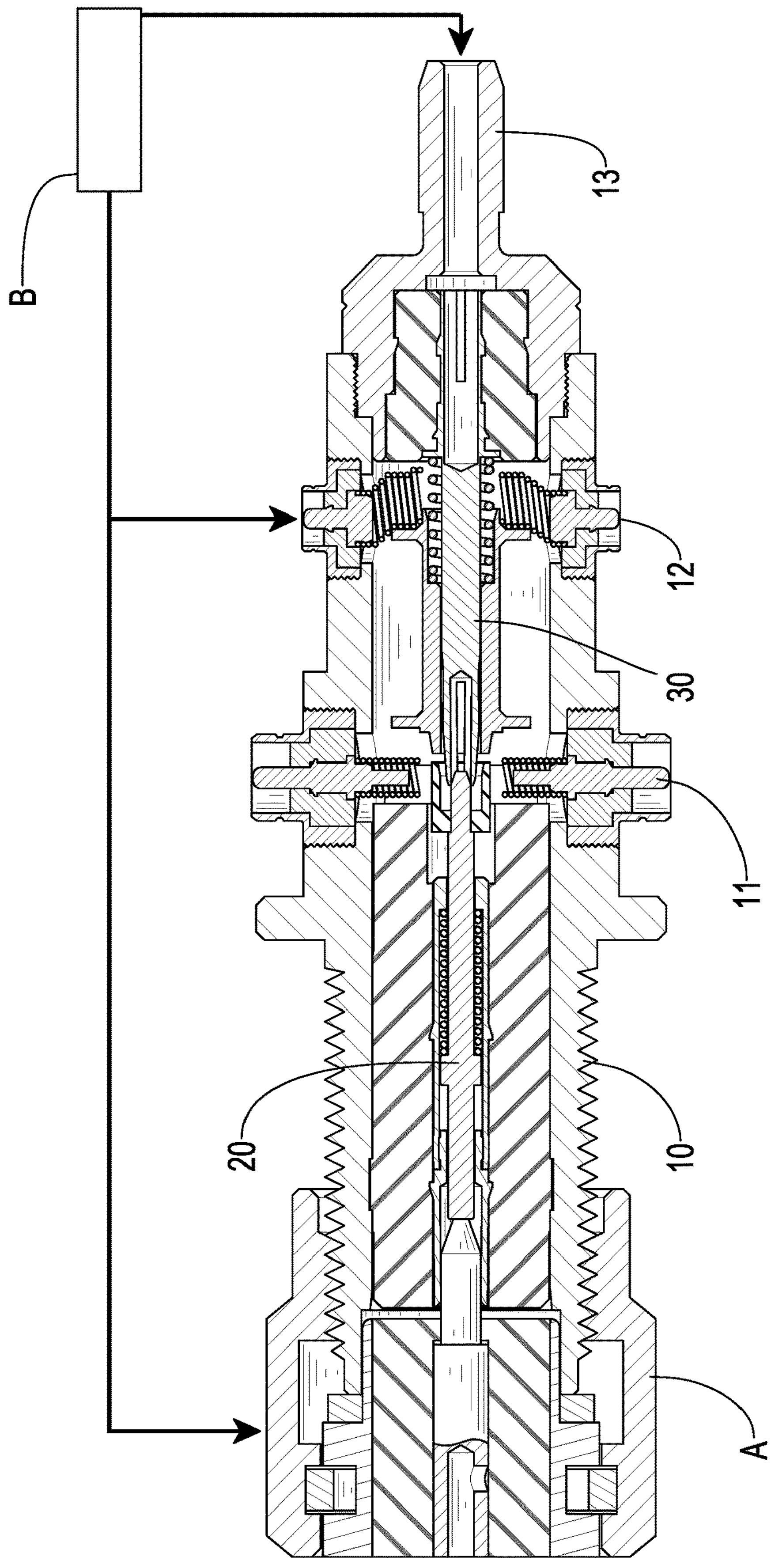
FIG. 7 is a cross sectional view of the first preferred embodiment connected to the external connector in accordance with the present invention, wherein the moving component is located at the second position.

With reference to FIG. 6 and FIG. 7, therefore, when conducting signal tests, it is necessary to test respectively when the moving component 30 is located at the first position and the second position. When the moving component 30 is located at the first position (as shown in FIG.

6), a wire of a test device B can be connected to any one of the at least one first signal junction 11 and the third signal junction 13, thereby testing transmission quality between the at least one first signal junction 11 and the third signal junction 1. When the moving component 30 is located at the second position (as shown in FIG. 7), the wire of the test device B can be connected to the external connector A, any one of the at least one second signal junction 12, and the third signal junction 13, thereby testing transmission quality between the external connector A, the at least one second signal junction 12, and the third signal junction 13.

Figure 8:
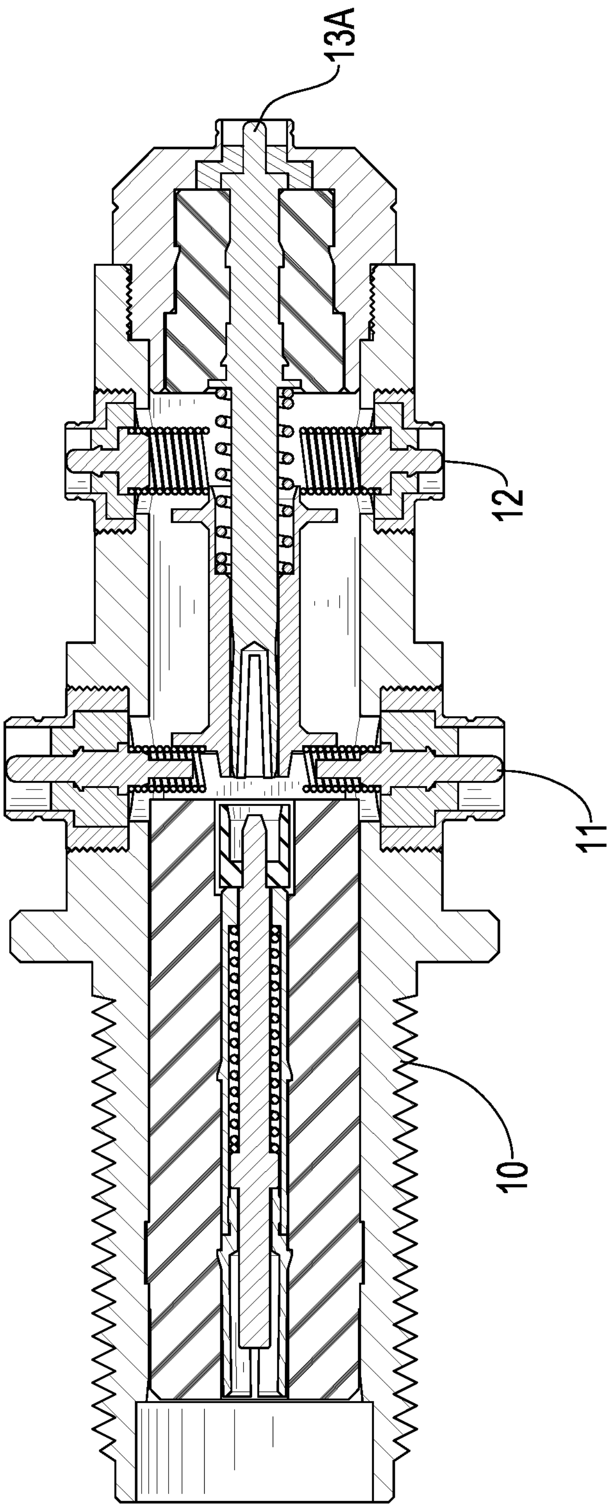
FIG. 8 is a cross sectional view of a second preferred embodiment in accordance with the present invention.

With reference to FIG. 8, a second preferred embodiment in accordance with the present invention is similar with the first preferred embodiment. Therefore, technical characteristics of the first preferred embodiment and the second preferred embodiment can be cross-referenced. The only difference in the second preferred embodiment is that the third signal junction 13 is also a radio frequency connector. Therefore, when conducting signal tests, the connection between the test device B and the third signal junction 13 can no longer be made by stripping and soldering, thereby greatly improving signal stability during each test.

Figure 9:
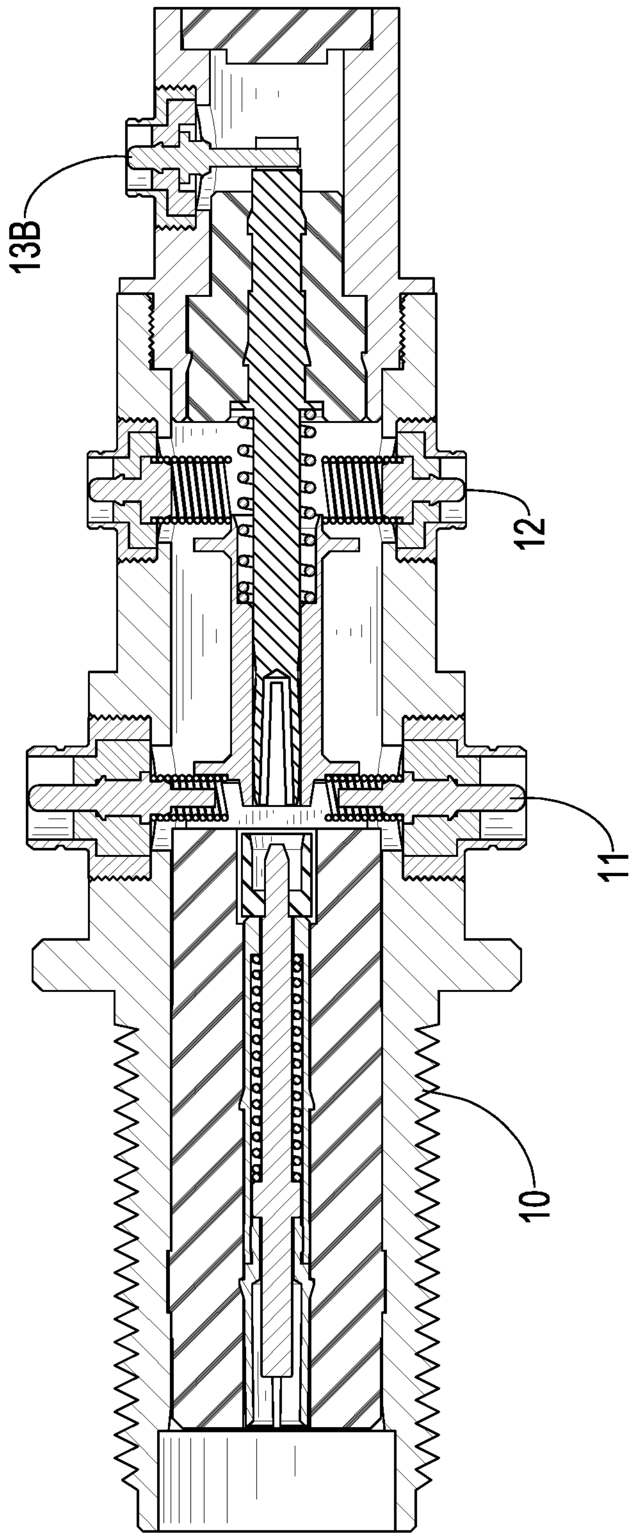
FIG. 9 is a cross sectional view of a third preferred embodiment in accordance with the present invention.
Figure 10:
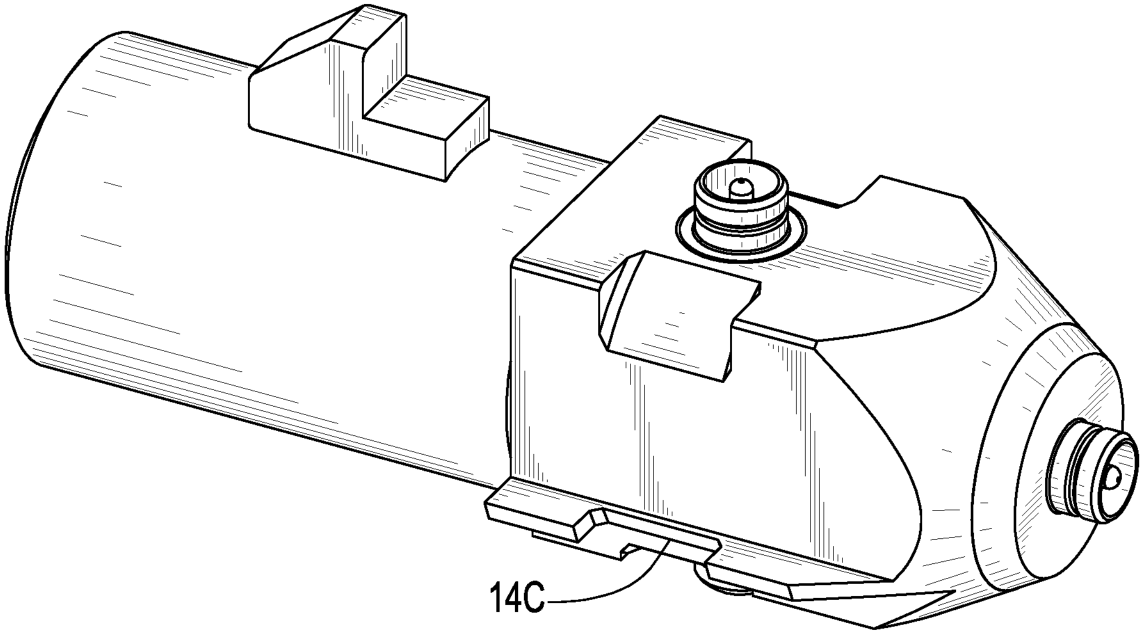
FIG. 10 is a perspective view of a fourth preferred embodiment in accordance with the present invention.
Figure 11:
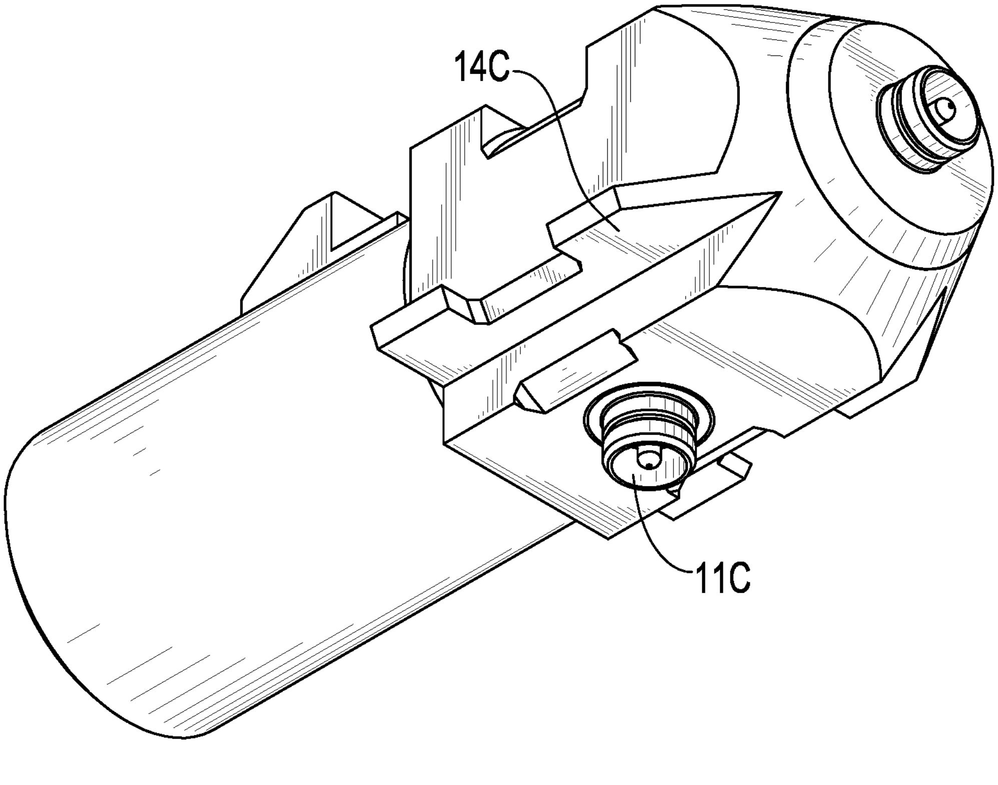
FIG. 11 is another perspective view of the fourth preferred embodiment in accordance with the present invention.
Figure 12:
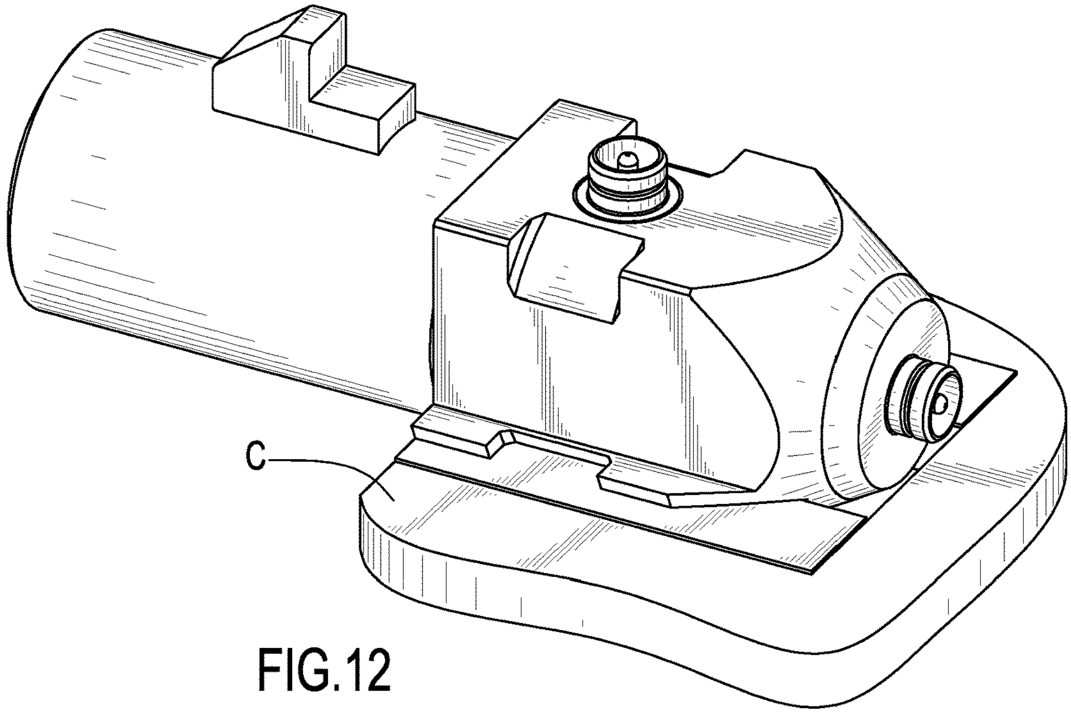
FIG. 12 is a schematic view of the fourth preferred embodiment combined with a circuit board in accordance with the present invention.
Figure 13:
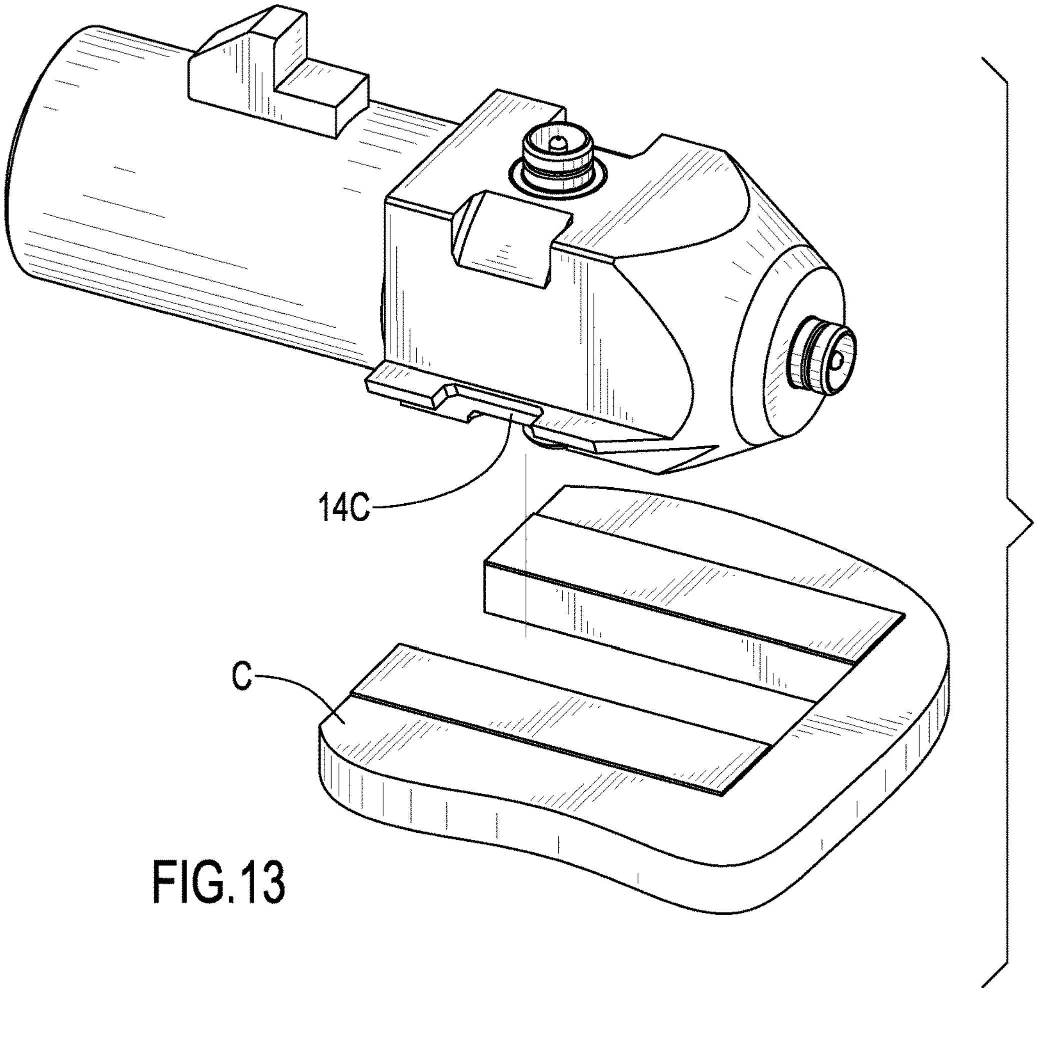
FIG. 13 is a motion diagram of the fourth preferred embodiment combined with circuit board in accordance with the present invention.
Figure 14:
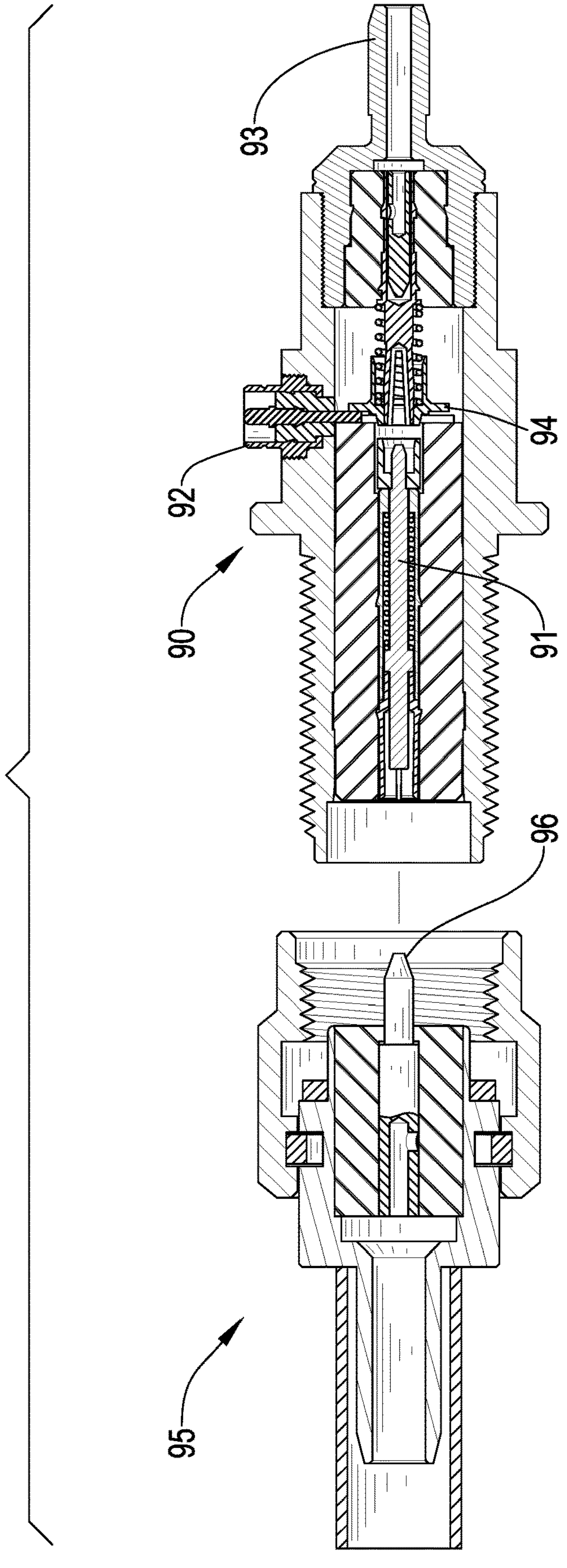
FIG.14 PRIOR ART
FIG. 14 is a schematic view of a coaxial connector of a prior art.

With reference to FIG. 9, a third preferred embodiment in accordance with the present invention is similar with the second preferred embodiment. Therefore, technical characteristics of the second preferred embodiment and the third preferred embodiment can be cross-referenced. The only difference in the third preferred embodiment is that the third signal junction 13 is mounted on the side surface of the shell 10 instead of on the end of the shell 10.

With reference to FIGS. 10 to 13, a fourth preferred embodiment in accordance with the present invention is similar with any one of the abovementioned preferred embodiments. Therefore, technical characteristics of the fourth preferred embodiment and any one of the abovementioned preferred embodiments can be cross-referenced. The only difference in the fourth preferred embodiment is that an outside surface of the coaxial connector forms two abutment surfaces 14C at a same imaginary plane and mounted apart. One of the at least one first signal junction or one of the at least one second signal junction can be located between the two abutment surfaces. In this embodiment, the coaxial connector can only have the first at least one signal junction 11C or the at least one second signal junction. When mounting the coaxial connector on a circuit board C, the circuit board can form a groove. The at least one first signal junction 11C is aligned with the groove. The two abutment surfaces 14C are matched with both sides of the circuit board, respectively.

In conclusion, the coaxial connector enhances diversity and throughput of signal transmission by mounting two signal junctions (the first signal junction 11 and the second signal junction 12) on the side surface of the coaxial connector. Moreover, there are multiple first signal junctions 11 and the second signal junctions 12, and thus the coaxial connector can be connected to several devices simultaneously. The at least one first signal junction 11 and the at least one second signal junction 12 have the elastic conductive component, thereby the moving component 30 can firmly abut on the elastic conductive component at different positions. It not only ensures the signal transmission quality, but also lowers the requirement of the manufacturing accuracy. After all, the third signal junction 13 is a radio frequency connector, no longer manually stripping and soldering wires, so that the signal status is the same for each operator when making connections instead of different results in different tests with the same product.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A coaxial connector comprising:

a shell;

at least one first signal junction mounted at a side surface of the shell;

at least one second signal junction mounted at the side surface of the shell;

a third signal junction mounted on the shell;

wherein the at least one second signal junction is located between the at least one first signal junction and the third signal junction;

a moving pin movably mounted in the shell; and a moving component movably mounted in the shell and selectively moved between a first position and a second position;

wherein when the moving component is moved to the first position, the moving component and the at least one first signal junction are electrically connected, and the moving component and the third signal junction are electrically connected; when the moving component is moved to the second position, the moving component and the at least one second signal junction are electrically connected, and the moving component and the third signal junction are electrically connected.

2. The coaxial connector as claimed in claim 1, wherein:

each of the at least one first signal junction has:

a first external connecting part exposed on the shell; and a first internal connecting part located in the shell and electrically connected to the first external connecting part; the first internal connecting part being an elastic conductive component;

each of the at least one second signal junction has:

a second external connecting part exposed on the shell; and a second internal connecting part located in the shell and electrically connected to the second external connecting part; the second internal connecting part being an elastic conductive component;

wherein when the moving component is moved to the first position, the moving component contacts the first internal connecting part of the at least one first signal junction; when the moving component moves to the second position, the moving component contacts the second internal connecting part of the at least one second signal junction.

3. The coaxial connector as claimed in claim 1, wherein:

an amount of the at least one first signal junction is two, four, or six; and an amount of the at least one second signal junction is two, four, or six.

4. The coaxial connector as claimed in claim 2, wherein:

an amount of the at least one first signal junction is two, four, or six; and an amount of the at least one second signal junction is two, four, or six.

5. The coaxial connector as claimed in claim 1, wherein the third signal junction is mounted on the side surface of the shell.

6. The coaxial connector as claimed in claim 2, wherein the third signal junction is mounted on the side surface of the shell.

7. The coaxial connector as claimed in claim 1, wherein the third signal junction is a radio frequency connector.

8. The coaxial connector as claimed in claim 2, wherein the third signal junction is a radio frequency connector.

9. The coaxial connector as claimed in claim 3, wherein all the first signal junctions are located at a first imaginary plane, and all the second signal junctions are located at a second imaginary plane; the first imaginary plane and the second imaginary plane are perpendicular to an axial direction of the shell.

10. The coaxial connector as claimed in claim 4, wherein all the first signal junctions are located at a first imaginary plane, and all the second signal junctions are located at a second imaginary plane; the first imaginary plane and the second imaginary plane are perpendicular to an axial direction of the shell.

11. The coaxial connector as claimed in claim 9, wherein all the first signal junctions are distributed point-symmetrically on the first imaginary plane with an axis of the shell as a symmetry axis, and all the second signal junctions are distributed point-symmetrically on the second imaginary plane with the axis of the shell as a symmetry axis.

12. The coaxial connector as claimed in claim 10, wherein all the first signal junctions are distributed point-symmetrically on the first imaginary plane with an axis of the shell as a symmetry axis, and all the second signal junctions are distributed point-symmetrically on the second imaginary plane with the axis of the shell as a symmetry axis.

* * * * *